(12) United States Patent
Maki et al.

(10) Patent No.: US 10,097,006 B2
(45) Date of Patent: Oct. 9, 2018

(54) CONTROL DEVICE FOR POWER CONVERTER, CONTROL PROGRAM AND POWER CONVERSION DEVICE

(71) Applicant: Kabushiki Kaisha Toshiba, Minato-ku (JP)

(72) Inventors: Koji Maki, Musashino (JP); Hiroshi Mochikawa, Hachioji (JP); Shingo Yanagimoto, Koto (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 51 days.

(21) Appl. No.: 15/504,564

(22) PCT Filed: Feb. 3, 2016

(86) PCT No.: PCT/JP2016/053159
§ 371 (c)(1),
(2) Date: Feb. 16, 2017

(87) PCT Pub. No.: WO2016/129464
PCT Pub. Date: Aug. 18, 2016

(65) Prior Publication Data
US 2018/0226803 A1    Aug. 9, 2018

(30) Foreign Application Priority Data
Feb. 10, 2015    (JP) .................. 2015-024295

(51) Int. Cl.
*H02J 3/38*    (2006.01)
*H02M 1/12*    (2006.01)
*H02M 7/42*    (2006.01)

(52) U.S. Cl.
CPC ............. *H02J 3/385* (2013.01); *H02M 1/12* (2013.01); *H02M 7/42* (2013.01)

(58) Field of Classification Search
CPC ......... H02J 3/385; H02M 7/42; G05B 11/016; G05F 1/52; Y02B 70/126
(Continued)

(56) References Cited

U.S. PATENT DOCUMENTS 5,892,672 A * 4/1999 Preller .............. H02M 3/33515
                                                   363/21.13
7,737,642 B2 * 6/2010 Yu ..................... H02M 7/53871
                                                   315/224

(Continued)

FOREIGN PATENT DOCUMENTS

JP    3359206 B2    12/2002
JP    4491622 B2    6/2010
(Continued)

OTHER PUBLICATIONS

International Search Report dated Apr. 26, 2016 in PCT/JP2016/053159 filed Feb. 3, 2016.

*Primary Examiner* — Yemane Mehari
(74) *Attorney, Agent, or Firm* — Oblon, McClelland, Maier & Neustadt, L.L.P.

(57) ABSTRACT

A control device includes a searching unit increasing or decreasing, at a predetermined step width, an operation voltage or an operation current of a power supply connected to a power converter to search a maximum power point of the power supply, a consecution time determining unit determining whether or not the searching unit has consecutively increased or decreased the operation voltage of the power supply or the operation current thereof, and a step width increasing unit increasing the step width upon determination by the consecution time determining unit that the increase or the decrease has been consecutively executed by a predetermined number of times.

13 Claims, 12 Drawing Sheets

(58) Field of Classification Search
USPC .................... 363/74–81, 95, 98, 108, 109
See application file for complete search history.

(56) References Cited

U.S. PATENT DOCUMENTS

| | | | |
|---|---|---|---|
| 8,625,307 B2* | 1/2014 | Iwata | H02M 7/49 363/17 |
| 8,674,544 B2* | 3/2014 | Rada | G05F 1/70 307/38 |
| 8,674,668 B2* | 3/2014 | Chisenga | H02M 3/156 323/266 |
| 8,754,627 B1 | 6/2014 | Le | |
| 2007/0137688 A1 | 6/2007 | Yoshida | |

FOREIGN PATENT DOCUMENTS

| | | |
|---|---|---|
| JP | 2012-221151 A | 11/2012 |
| JP | 2014-146279 A | 8/2014 |
| JP | 2016-38816 A | 3/2016 |

* cited by examiner (a)

(b)

(c)

CONTROL DEVICE FOR POWER CONVERTER, CONTROL PROGRAM AND POWER CONVERSION DEVICE

CROSS-REFERENCE TO RELATED APPLICATIONS

This application is based upon and claims a priority of Japanese Patent Application No. 2015-024295, filed on Feb. 10, 2015, the contents being incorporated herein by reference.

FIELD

Embodiments of the present disclosure relate to a control device for a power converter which search the maximum power point of a power supply, a control program, and a power conversion device.

BACKGROUND

Dispersed power supplies, such as a solar light power generation device, a wind power generation device, a fuel cell battery, and a secondary battery, need a power conversion device for a connection to a load and an interconnection with a system. For example, a solar power generation device is configured to be connected to a power conversion device called a Power Conditioning System (PCS) in order to supply desired power to a system.

Present PCSs include, in many cases, a power converter like a DC-DC converter to boost up the voltage and a so-called inverter for DC-AC conversion, and a control unit thereof. In addition, the PCS includes a Maximum power point Tracker (MPPT) control unit that tracks the maximum power point where the output power becomes the maximum during a change in amount of solar radiation time by time.

According to the MPPT, under the weather conditions, etc., that always fluctuate, the value of current×voltage that maximizes the power, i.e., the maximum power point is automatically obtained. According to such an MPPT, a generally adopted scheme to search the maximum power point is a hill climbing method. The hill climbing method is a method which changes the battery voltage by a predetermined step width at a certain time interval, checks the increase or decrease of the output power, and increases or decreases the voltage so as to always increase the output power, thereby searching the maximum power point.

As for the searching technologies relating to the hill climbing method, the following technologies are proposed.

(1) As the primary search, a searching operation is performed at a rough voltage step width set within the certain voltage range. Next, after the neighborhood of the top among the plural mountains is detected, as the secondary search, a searching operation is performed at a narrower voltage step width than that of the primary search (see, for example, Patent Document 1).

(2) After the search within the certain voltage range, an approximated curve is calculated based on the relationship between the generated power and the voltage, and the voltage step width is set in accordance with the curvature of the curved line (see, for example, Patent Document 2).

(3) Across the maximum power point in the current-voltage curved line, the searching operation is divided into the current mode and the voltage mode. In the current mode, the current is changed at a predetermined current step width, and in the voltage mode, the voltage is changed at a predetermined voltage step width (see, for example, Patent Document 3).

(4) The detection error originating from capacitance parasitic in the solar battery is reduced. That is, when the voltage and the current are changed at fast speed, the current-voltage curved line is changed due to the discharging and charging of the capacitance, generating a hysteresis loop. In order to eliminate this effect, the voltage and the current at a time point at which the voltage time-derivative value becomes zero are detected (see, for example, Patent Document 4).

CITATION LIST

Patent Literatures

Patent Document 1: JP 2012-221151A
Patent Document 2: Japan Patent No. 3359206
Patent Document 3: U.S. Pat. No. 8,754,627
Patent Document 4: Japan Patent No. 4491622

Meanwhile, according to the above technologies (1)-(4), there is a mode to search the maximum power point at a voltage step width within a given certain range. Hence, searching operation requires time, resulting in a loss of power generation opportunity.

In addition, like the technology (4), according to the method of obtaining a time derivative so as to reduce the effect of capacitance parasitic in the solar battery, the detected value of the voltage, etc., is unstable, and the derivative value is not likely to become zero. Hence, a determination should be made based on a fact that the derivative value becomes equal to or smaller than a certain threshold, but in this case, multiple control adjustments are necessary.

Still further, when the maximum power point is searched at fast speed, it is necessary to control the voltage of the capacitor or the current of the reactor which is the energy buffer of the power conversion device at fast speed. In this case, the generated power of the solar battery changes rapidly. Such a rapid change produces harmonic.

However, depending on a device and a system connected to the output of the power conversion device, since there is a limitation that does not accept a rapid change, the fast-speed search is difficult in some cases. An example limitation is a harmonic restriction of an AC system to avoid a radio disturbance therearound.

In order to address this technical problem, the power-voltage characteristic curve may be scanned at a constant cycle, and a power control band may be extended. In order to do so, however, the costs increase since the number of components increases and expensive control circuit and element are necessary.

Embodiments of the present disclosure have been proposed to address the above technical problems of conventional technologies, and a first objective is to provide a control device for a power converter, a control program and a power conversion device which are capable of searching the maximum power point at fast speed in a generated power maximizing control, decrease a loss of power generation opportunity to obtain large power, and need little control adjustment.

In addition, a second objective is to provide a control device for a power converter, a control program and a power conversion device which are capable of reducing the size of an energy buffer and costs thereof while speeding up a search time.

SUMMARY

In order to accomplish the above objectives, a control device for a power converter according to an embodiment of the present disclosure includes:

a searching unit increasing or decreasing, at a predetermined step width, an operation voltage or an operation current of a power supply connected to the power converter to search a maximum power point of the power supply;

a consecution time determining unit determining whether or not the searching unit has consecutively increased or decreased the operation voltage of the power supply or the operation current thereof; and a step width increasing unit increasing the step width upon determination by the consecution time determining unit that the increase or the decrease has been consecutively executed by a predetermined number of times.

Note that as other aspects, the present disclosure is considerable as a program that causes a computer to accomplish the respective functions of the above units. In addition, as other aspects, also, a power conversion device including a power converter and the above control device is also accomplishable.

DETAILED DESCRIPTION

First Embodiment

Figure 1:
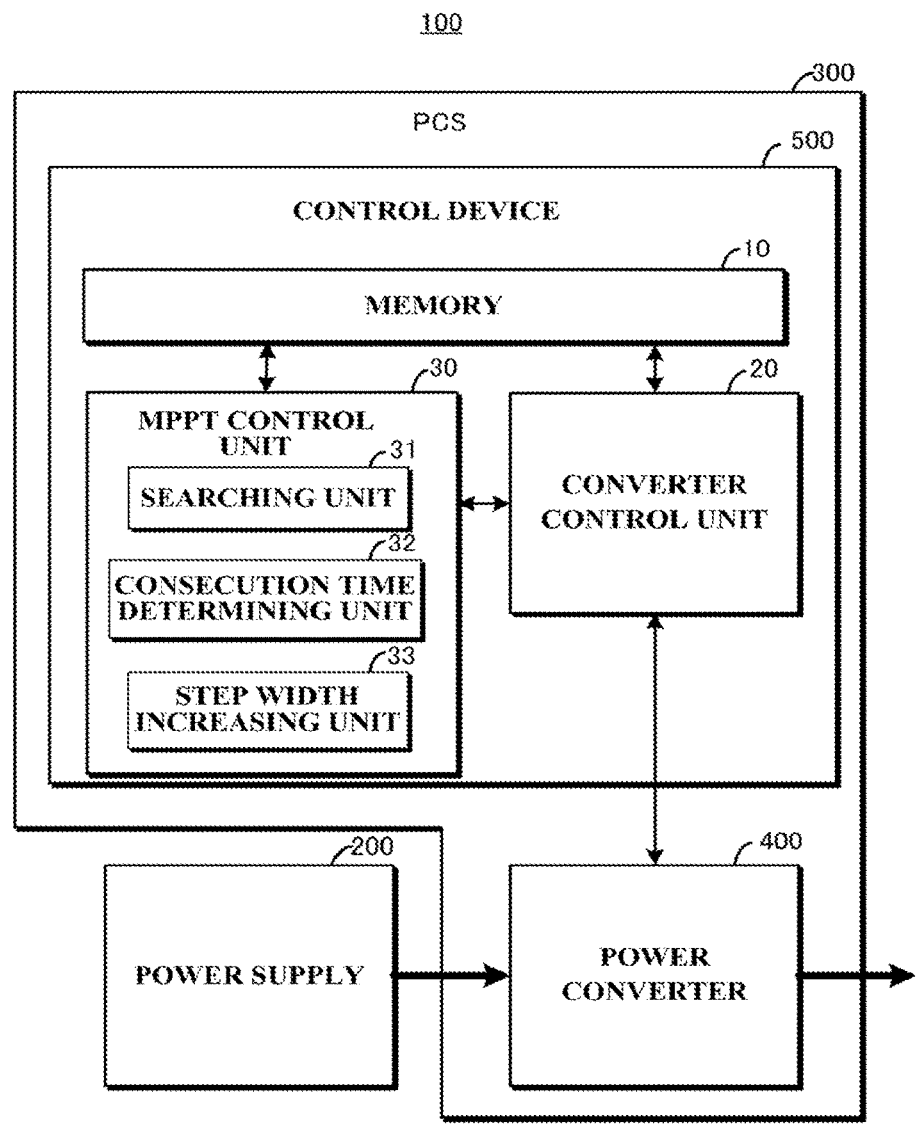
FIG. 1 is a block diagram illustrating a power conversion device according to an embodiment.

A power supply system 100 according to this embodiment will be explained with reference to FIG. 1. This power supply system 100 includes a power supply 200 and a PCS 300.

[Configuration]
[Power Supply]

The power supply 200 is a source of supplying power. An example power supply 200 is a dispersed power supply. The dispersed power supply is a power generation facility disposed and dispersed at a location nearer the power demanding site in comparison with a large-scale power generation plant. As for the power supply 200 in this embodiment, a solar light power generation device, a wind power generation device, etc., which have relatively unstable generated power are suitable, but the present disclosure is not limited to those examples. A fuel cell battery, a secondary battery, etc., are also applicable. The following explanation will be given of an example case in which the power supply 200 is a solar power generation device.

[PCS]

The PCS 300 is a power conversion device that converts the generated power by the power supply 200 into power appropriate for a load and a system. The PCS 300 includes a power converter 400, and a control device 500.

The power converter 400 is a circuit that converts input power. The power converter 400 includes, for example, a DC-DC converter that boosts up the DC voltage from the power supply 200, and an inverter that converts the DC power into AC power and outputs this AC power. The DC-DC converter, and the inverter each include switching elements, and are capable of outputting desired power by the switching operation. The switching element is a self-extinguishing type element, such as a GTO, a MOSFET, an IGBT, or an IEGT, and is connected to a power supply and a drive circuit.

The power converter 400 is not limited to the above configuration. Various converters available presently or in future are applicable. For example, the power converter 400 that includes only the DC-DC converter may be applied to supply DC power. In addition, the power converter 400 that includes only the inverter and has the DC-DC converter omitted is also applicable. Still further, the power converter 400 may be a Module Integrated Converter (MIC), such as a DC-DC optimizer or a micro-inverter, placed individually in not the PCS 300 but each power supply 200 like the solar power generation device.

The control device 500 controls the power converter 400. The control device 500 is accomplished by a computer that is controlled by a predetermined program, or a special-purpose electronic circuit. In this case, the program physically utilizes the hardware resources of the computer to accomplish the process of each component to be explained later. Note that the method of executing the process by each component, the program, and a non-transitory recording medium having stored therein the program are also aspects of the embodiment. In addition, how to set the range processed by the hardware resource, and the range processed by a software including the program is not limited to any particular manner.

This control device 500 includes a memory 10, a converter control unit 20, and an MPPT control unit 30. The memory 10 is a process unit that stores various information necessary for a power conversion process by the PCS 300. As for the memory 10, all memory media that are available presently or in future, such as a semiconductor memory and a hard disk, are applicable. A memory medium that has already stored therein information may be loaded in a reader device to utilize the stored contents for various processes, thereby accomplishing the memory 10.

This memory 10 includes a main memory device that stores a program, etc., and a cache memory, a buffer memory, a register, etc., which are utilized as a temporal memory area. A memory area for information input from the exterior via unillustrated sensor and network, and information exchanged by buffering a difference in process timing among respective components are also considerable as the memory 10.

Example information stored in the memory 10 is information detected and input by the sensor, information input from the exterior via a network, and information generated by the converter control unit 20 and the MPPT control unit 30 to be explained later. Such information contains the operation voltage of the power supply 200, the operation current thereof, the generated power by the power supply 200, a voltage instruction value, and a current instruction value, etc. The operation voltage, the operation current, the generated power, the voltage instruction value, and the current instruction value may be each a detected value, or may be an estimated value obtained by an arithmetic process of the control device 500 based on any actual measured value.

In addition, this information also contains a setting value that is set up beforehand for the process by the MPPT control unit 30 and the process by the converter control unit 20. The setting value contains a search start position, the MPPT control timing, the step width for MPPT, a number of consecution times, the increase of step width, a number of repeat times, the decrease of step width, the resolution of a carrier wave, the minimum width of the step width, a search range covering the upper limit and the lower limit, a number of reaching times to the upper limit or the lower limit, and the cycle of AC power. How to utilize those pieces of information will be explained later.

The converter control unit 20 is a process unit that controls the power converter 400. For example, the converter control unit 20 outputs an ON-OFF switching instruction for the switching elements of the power converter 400 to the drive circuit, thereby causing the power converter 400 to output power in accordance with the voltage instruction value or the current instruction value. The control by the converter control unit 20 is performed by, for example, a PWM control. The PWM control is a control to turn ON the switching elements within a time period in which a modulation wave is larger when compared with a carrier wave.

The MPPT control unit 30 is a process unit that performs a generated power maximizing control. That is, the MPPT control unit 30 searches the operation point where the output power by the power supply 200 becomes the maximum. This MPPT control unit 30 includes a searching unit 31, a consecution time determining unit 32, and a step width increasing unit 33.

The searching unit 31 is a process unit that increases or decreases the operation voltage of the power supply 200 connected to the power converter 400 or the operation current thereof at a predetermined step width, thereby searching the maximum power point of the power supply 200. That is, the searching unit 31 performs an MPPT control by a hill climbing method. According to the hill climbing method, for example, as indicated by the power-voltage characteristic illustrated in FIG. 2, the operation voltage of the power supply 200 is changed, at a predetermined control timing, by $\Delta V$ that is the predetermined step width, thereby checking whether or not the output power is increased or decreased.

Next, $\Delta v$ is increased or decreased in the increasing direction. By repeating this operation, a maximum power point Pmax is searched. The predetermined control timing is a certain time interval set in the memory 10 beforehand. The predetermined step width is a variability width of the voltage or the current set in the memory 10 beforehand.

Note that the searching unit 31 starts the searching operation from a search start position set in the memory 10 beforehand. The search start position is any position between the position corresponding to a short-circuit current at zero voltage in FIG. 2 and the position corresponding to an open voltage at zero current. Hence, the search may start from the short-circuit-current position or the open-voltage position. As will be explained later, however, when a search range is set, the search starts from either the upper limit or the lower limit of this range.

Figure 2:
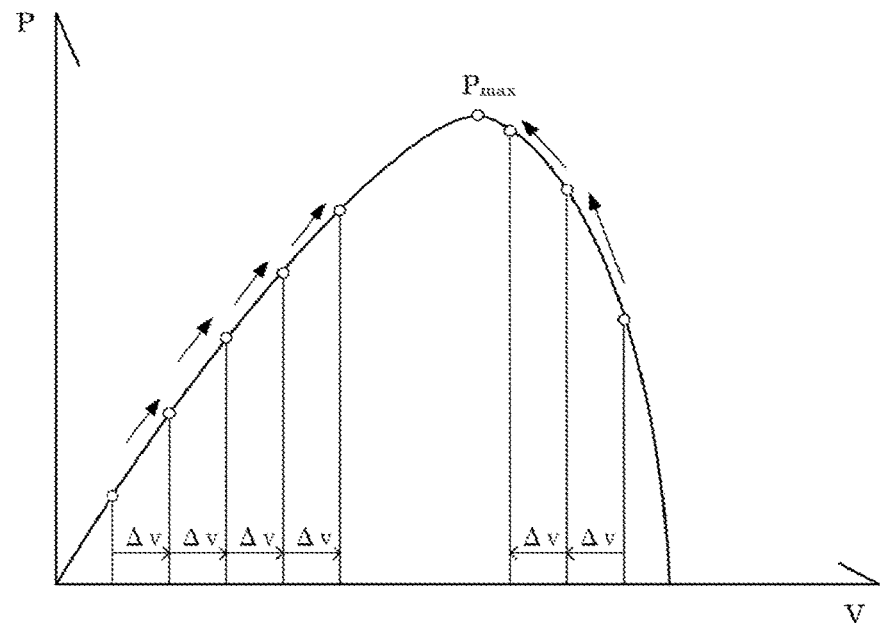
FIG. 2 is a diagram illustrating a voltage-power characteristic in an MPPT control by a general hill climbing method.

The consecution time determining unit 32 is a process unit that determines whether or not the searching unit 31 has consecutively increased or decreased the operation voltage of the power supply 200 or the operation current thereof by a predetermined number of times. The term consecutively increase or decrease means every time the search is executed at a constant control cycle, the operation voltage or the operation current which has been increased is further increased or which has been decreased is further decreased as illustrated in FIG. 2 during the process of increasing or decreasing the operation voltage or the operation current.

The step width increasing unit 33 is a process unit that increases the step width when the consecution time determining unit 32 determines that the continuous increase or decrease has been performed by the predetermined number of times. The predetermined number of times is a number of consecution times set in the memory 10 beforehand. An increment value is a value to increase the step width and set in the memory 10 beforehand. As for the increment value, an addition value may be set or a numerical value to be multiplied for the increase may be set.

Figure 3:
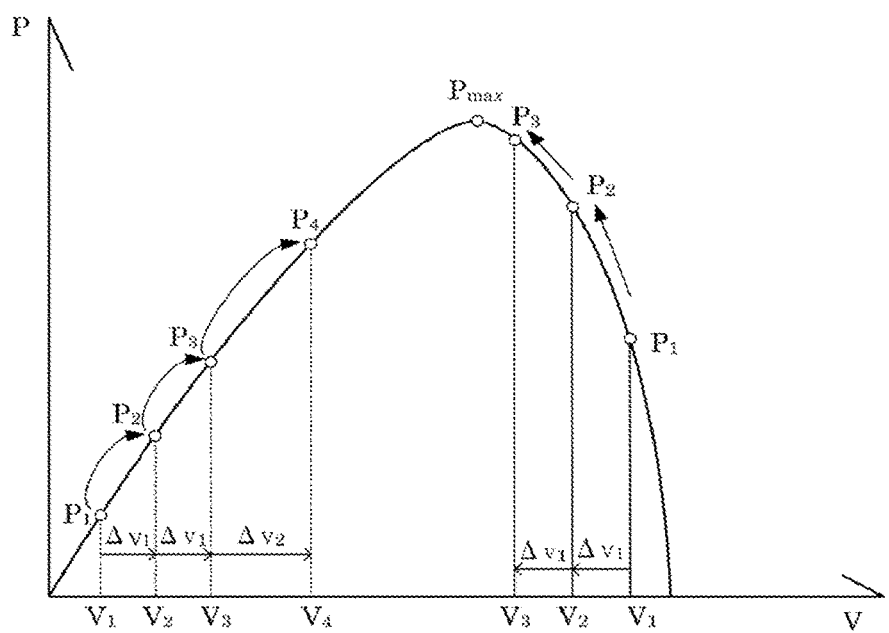
FIG. 3 is a diagram illustrating a voltage-power characteristic in an MPPT control according to a first embodiment.

When, for example, the predetermined number of times is two, as indicated by the power-voltage characteristic illustrated in FIG. 3, it is assumed that the searching unit 31 consecutively increases an operation voltage V1 to V2, and to V3 twice by $\Delta V1$, and power is increased from P1 to P3. In this case, the step width increasing unit 33 increases by $\Delta V2$ that is the increase value to which $\Delta V1$ is further added.

In addition, although it is not illustrated in the figure, the PCS 300 is connected to an input unit and an output unit. The input unit is a component to input necessary information for the process by the PCS 300, a selection of a process, and an instruction. Through input unit, an operator is capable of inputting information to be stored in the memory 10. Example input units are all input devices available presently or in future, such as a keyboard, a mouse, a touch panel (including one displayed on a display device), a switch and a sound input device.

The output unit is a component that enables the operator to recognize the information stored in the memory 10 of the PCS 300, the process result of each unit, etc. Example output units are all output devices available presently or in future, such as a display device, a printer, a gauge, a lamp, a speaker, and a buzzer. For example, by displaying the information in the process on the display device in the form of a numeric number, a graph, etc., the operator is capable of checking the operation status. Note that the input unit and the output unit also include a console panel of the PCS 300, a computer terminal for an operation connected to the PCS 300 via a cable or a network.

[Action]

Figure 4:
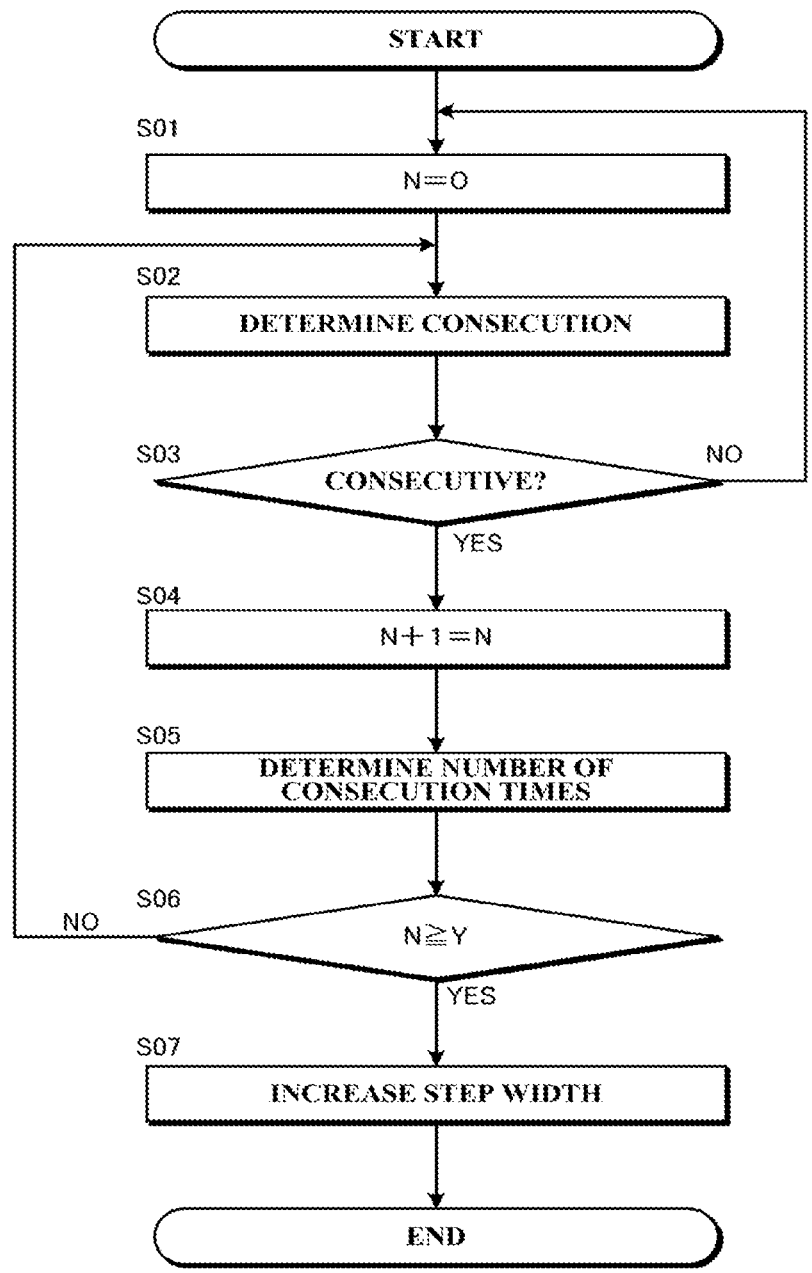
FIG. 4 is a flowchart illustrating a process of increasing a step width according to the first embodiment.

An action of this embodiment will be explained with reference to FIGS. 3 and 4. In the following example, basically the same process is applied when the operation voltage of the power converter 400 is changed to perform a power maximizing control and when the operation current is changed to perform the power maximizing control.

(Process Outline)

First, as illustrated in FIG. 3, the MPPT control unit 30 of this embodiment changes the voltage from a low voltage to a high voltage by the constant step width Δv1 in the direction in which the power increases from P1 to P3. When the voltage is changed multiple times in the same direction, this means that the search has not reached the maximum power point Pmax. In this case, the MPPT control unit 30 increases the step width to Δv2 that is larger than Δv1, thereby performing a control so as to reach the maximum power point Pmax faster.

(Process Procedure)

The procedure of the process of increasing the step width according to this embodiment as explained above will be explained with reference to the flowchart of FIG. 4. Note that this increasing process is a part extracted from a process consecutively executed during the power maximizing process by the searching unit 31. That is, a process per an increase of the step width will be explained.

At the start of the MPPT control by the searching unit 31, the consecution time determining unit 32 initializes a variable N that indicates the number of consecution times (step S01). Next, the consecution time determining unit 32 determines (step S02) whether or not the searching unit 31 has consecutively increased or decreased the voltage value during the searching. When determining that the searching unit 31 has consecutively increased or decreased the voltage value (step S03: YES), the consecution time determining unit 32 increments (step S04) the variable N that indicates the number of consecution times.

Next, the consecution time determining unit 32 determines (step S05) whether or not the variable N reaches a predetermined number of times Y. When determining that the variable N has not reached the predetermined number of times Y (step S06: NO), the consecution time determining unit 32 returns the process to a consecution determining process (step S02). Next, when determining that the searching unit 31 has consecutively increased or decreased the voltage value (step S03: YES), the consecution time determining unit 32 increments (step S04) the variable N.

The consecution time determining unit 32 determines (step S05) whether or not the variable N has reached the predetermined number of times Y. When the consecution time determining unit 32 determines that the variable N has reached the predetermined number of times Y (step S06: YES), the step width increasing unit 33 increases (step S07) the step width for the search by the searching unit 31.

Conversely, when the consecution time determining unit 32 determines (step S03: NO) that the voltage value has not been consecutively increased or decreased, the variable N is initialized (step S01). Hence, only when the operation voltage is consecutively increased or decreased, the next step width increasing process is executed.

The searching unit 31 keeps searching at the increased step width, and when the voltage value is further consecutively increased or decreased, the above step width increasing process is further executed.

[Effects]

The control device 500 for the power converter 400 includes the searching unit 31 that increases or decreases the operation voltage of the power supply 200 connected to the power converter 400 or the operation current thereof by the predetermined step width to search the maximum power point of the power supply 200, the consecution time determining unit 32 that determines whether or not the searching unit 31 has consecutively increased or decreased the operation voltage of the power supply 200 or the operation current thereof, and the step width increasing unit 33 that increases the step width when the consecution time determining unit 32 determines that the operation voltage or current has been consecutively increased or decreased by the predetermined number of times.

When the searching unit 31 is performing the searching in the direction in which the voltage value is consecutively increased or decreased by the predetermined number of times, this means that the search has not reached the point where the generated power becomes the maximum. In this embodiment, the step width is increased while the voltage value increased by the predetermined number of times is detected. Hence, the search is capable of reaching the point where the generated power becomes the maximum faster, decreasing the loss of power generation opportunity, and increasing the amount of power to be obtained by power generation.

When the search start point by the searching unit 31 is set at a position corresponding to the short-circuit current or the open voltage, the search stars from the far position away from the maximum power point. In this case, the speed-up of the search by the increase or decrease of the step width according to this embodiment is effective.

In addition, the search start point by the searching unit 31 may be set at a high-voltage side relative to the maximum power point. In this case, as illustrated in FIGS. 2 and 3, since the slope of the curved line of the power-voltage characteristic is steeper than that of the low-voltage side, the search is capable of reaching the maximum power point further faster. For example, the search may start from the position corresponding to the open voltage.

Second Embodiment

[Configuration]

Figure 5:
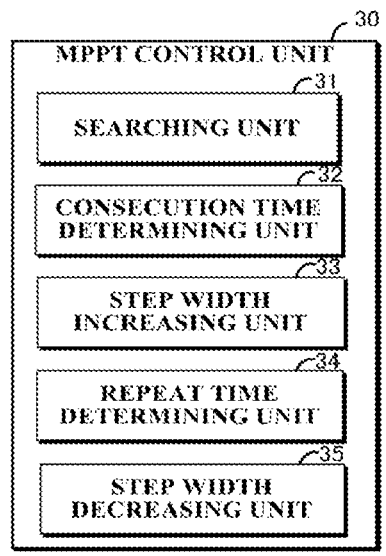
FIG. 5 is a block diagram illustrating an MPPT control unit according to a second embodiment.

This embodiment employs basically the same configuration as that of the above first embodiment. However, as illustrated in FIG. 5, the MPPT control unit 30 of this embodiment includes a repeat time determining unit 34, and a step width decreasing unit 35. The repeat time determining unit 34 is a process unit that determines whether or not the searching unit 31 has repeatedly increased or decreased the operation voltage of the power supply 200 or the operation current thereof.

The step width decreasing unit 35 is a process unit that decreases the step width when the repeat time determining unit 34 determines that the repeating has been executed by a predetermined number of times. The predetermined number of times is set in the memory 10 beforehand, and is an expected number of repeat times of the increase or the decrease around the maximum power point. The decrement value is a value which is set in the memory 10 beforehand and which decreases the step width. As for the setting of decrement value, a decrease amount may be set, or a numerical value for a multiplication or division for decrease may be set.

[Action]

Figure 6:
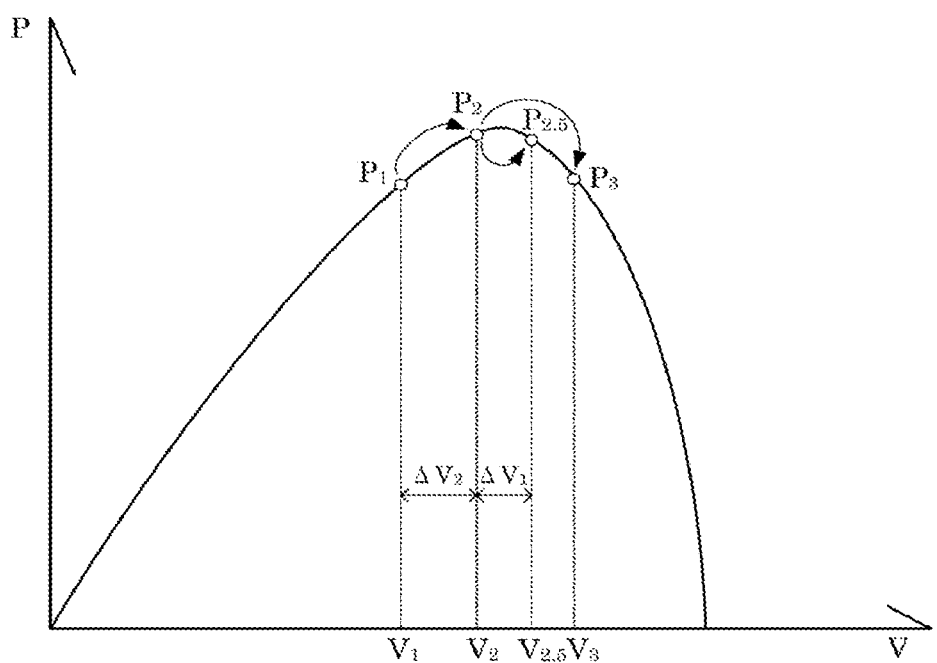
FIG. 6 is a diagram illustrating a voltage-power characteristic in an MPPT control according to the second embodiment.
Figure 7:
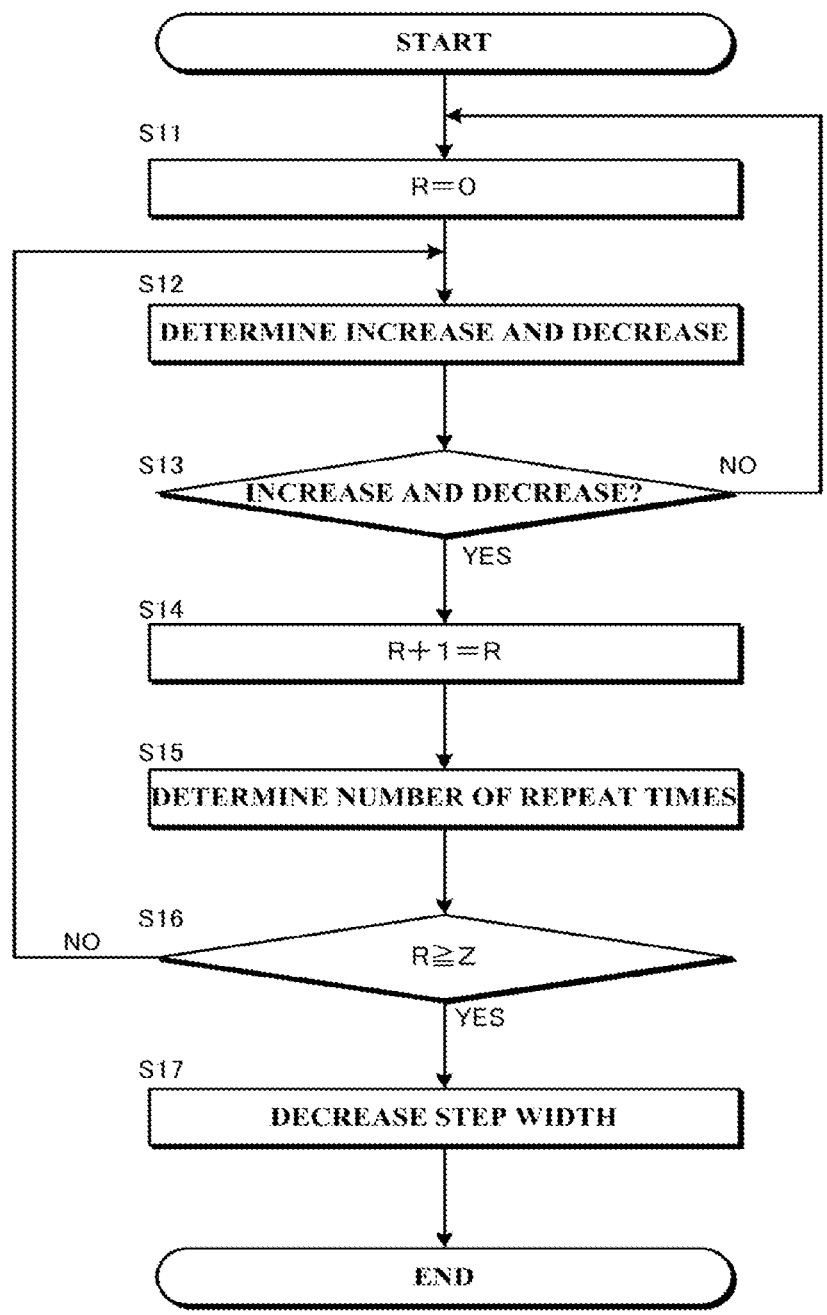
FIG. 7 is a flowchart illustrating a process of decreasing a step width according to the second embodiment.

The action of this embodiment will be explained with reference to FIG. 6 and FIG. 7. In the following explanation, basically the same process is applied when the operation voltage of the power converter 400 is changed to perform the power maximizing control and when the operation current is changed to perform the power maximizing control.

(Process Outline)

When the voltage step width is large, although the search time becomes short, the generated power may temporarily decrease. Conversely, when the voltage step width is small, although the search time becomes long, the generated power does not decrease. In order to accomplish a well-balanced effect in this trade-off relationship, a case in which the search is far away from the point where the generated power becomes the maximum and a case in which the search is close to that point are estimated based on the action in accordance with the hill climbing method, and the voltage step is increased when the search is far, and the voltage step is decreased when the search is close.

That is, according to this embodiment, basically the same operation as that of the first embodiment is executed. However, as illustrated in FIG. 6, according to the search by the searching unit 31 through the hill climbing method, when the voltage of the power supply 200 comes to a point near the maximum power point, the increase and decrease of the voltage value are repeated. Such increase and decrease will be referred to as a reciprocating operation.

In the reciprocating operation condition, the maximum power point is highly possibly present within this range. Hence, by reaching the maximum power point with the step width being decreased, the generated power in the steady condition is stably increased.

(Process Procedure)

The procedure of the process of increasing the step width according to this embodiment as explained above will be explained with reference to the flowchart that is FIG. 7. Note that this process is a part extracted from a process consecutively executed in the power maximizing process by the searching unit 31. That is, a process per a decrease of the step width will be explained. In addition, this process is executed when the search by the searching unit 31 comes around the maximum power point through the process of the above first embodiment.

The repeat time determining unit 34 initializes (step S11) a variable R that indicates the number of repeat times in the start of the MPPT control by the searching unit 31. Next, the repeat time determining unit 34 determines (step S12) whether or not the searching unit 31 has decreased or increased subsequent to the increase or decrease of the voltage value during the search. When determining that the voltage value has been decreased or increased subsequent to the increase or decrease thereof (step S13: YES), the repeat time determining unit 34 increments (step S14) the variable R that indicates the number of repeat times.

Next, the step width decreasing unit 35 determines (step S15) whether or not the variable R has reached a predetermined number of times Z. When determining that the variable R has not reached the predetermined number of times Z (step S16: NO), the step width decreasing unit 35 returns (step S12) the process to an increase and decrease determining process.

In addition, when determining that the searching unit 31 has increased or decreased the voltage value (step S13: YES), the repeat time determining unit 34 increments (step S14) the variable R. The step width decreasing unit 35 determines (step S15) whether or not the variable R has reached the predetermined number of times Z. When determining that the variable R has reached the predetermined number of times Z (step S16: YES), the step width decreasing unit 35 decreases (step S17) the step width for the search by the searching unit 31.

Conversely, when determining, in the step S12, that the voltage value has not been increased and decreased (step S13: NO), the repeat time determining unit 34 initializes (step S11) the variable R. Hence, only when the operation voltage is consecutively increased and decreased, the step width decreasing process is executed.

The searching unit 31 keeps searching with the decreased step width, but every time the increase and decrease are repeated, the above step width decreasing process is executed to search the maximum power point.

[Effects]

According to this embodiment, in addition to the configuration of the above first embodiment, the searching unit 31 includes the repeat time determining unit 34 that determines whether or not the increase and decrease of the operation voltage of the power supply 200 or the operation current thereof are consecutively repeated by the predetermined number of times, and the step width decreasing unit 35 that decreases the step width when the repeat time determining unit 34 determines that the increase and decrease are consecutively repeated by the predetermined number of times.

Hence, first, like the first embodiment, when the operation voltage is consecutively increased, it is estimatable that the search is still far away from the maximum power point, the search time is reduced by increasing the step width. In addition, when the increase of the operation voltage and the decrease thereof are repeated, it is estimatable that the search is near the maximum power point, and thus the reduction of the generated power is prevented by decreasing the step width. Hence, in addition to the first embodiment, by combining the operation of this embodiment, an effect of accomplishing both the search at short times and the maximized power generation is obtainable.

Third Embodiment

This embodiment employs basically the same configuration as that of the second embodiment. However, the minimum value of the step width set in the memory 10 beforehand is set based on the resolution of the carrier wave compared with a modulation wave by the converter control unit 20. That is, when a digital control is performed, as illustrated in FIG. 8(a), the carrier wave has a minimum resolution n that is a control cycle for a comparison with the modulation wave.

In this embodiment, like the second embodiment, this resolution n is set as the minimum step width when the step width is decreased. When, for example, the power converter 400 is a voltage type, a change in voltage is defined as the resolution of the carrier wave to be compared with the modulation wave and when the power converter 400 is a current type, a change in current is defined as such a resolution.

Figure 8:
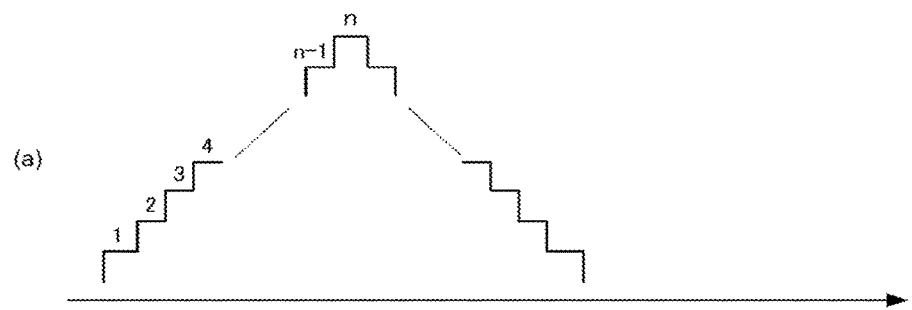
FIGS. 8(a)-8(c) are each an explanatory diagram for a resolution of a carrier wave, a capacity of a power converter, and a decrease width of a voltage, according to a third embodiment.
Figure 8:
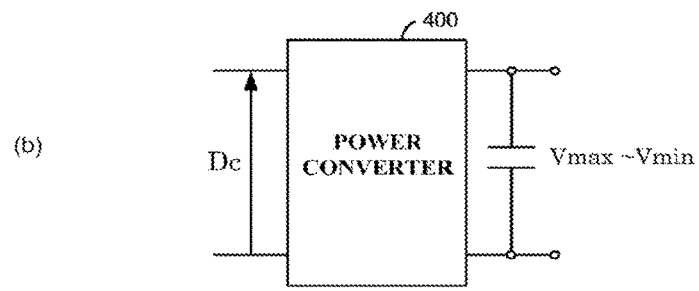
Figure 8:
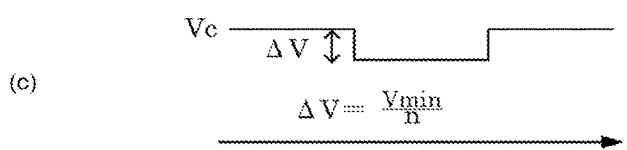

FIG. 8(b) illustrates an example case in which the power converter 400 is a voltage type. In general, the voltage-type power converter 400 has a capacitor C that servers as an energy buffer which accumulates energy in the form of voltage. The voltage varies to some level depending on the accumulated energy amount. When this variability range is defined as Vmax−Vmin, as illustrated in FIG. 8(c), a value obtained by dividing the minimum value Vmin by the resolution n of the carrier wave is set to the minimum step width ΔV that is to be subtracted from the voltage value Vc.

Hence, in the voltage-power characteristic of the power supply 200, a reduction of the generated power is suppressed, and a steady maximization of power generation is enabled. Note that in the case of a current-type power converter 400 that has a reactor serving as an energy buffer, the minimum step width to decrease the current value may be set with reference to the resolution. It is not always necessary that the step width matches the minimum resolution. When, for example, the resolution is sufficiently high, the step width may be, for example, twice as much as the minimum resolution.

Fourth Embodiment

[Configuration]

Figure 9:
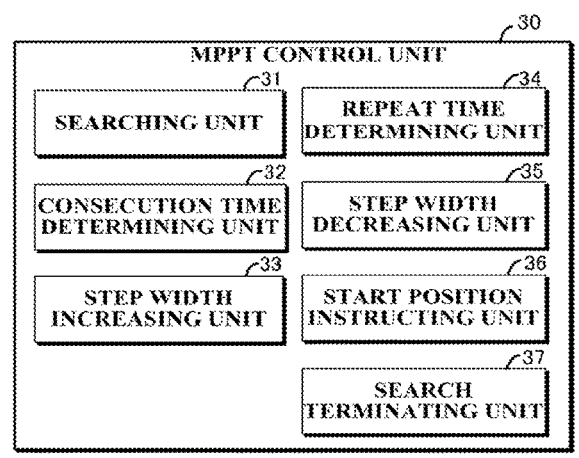
FIG. 9 is a block diagram illustrating an MPPT control unit according to a fourth embodiment.

This embodiment employs basically the same configuration as that of the second embodiment. However, as illustrated in FIG. 9, the MPPT control unit 30 of this embodiment includes a start position instructing unit 36, and a search terminating unit 37. In addition, the search range by the searching unit 31 is set in the memory 10 beforehand. The search range is between the upper limit and the lower limit of the voltage or the current to be searched.

The major reasons why such a search range is set are as follows:

(1) Strategic reason on whether the preference is given to a search time or a precise search; and
(2) Restriction over the specification of the power converter 400.

As for the reason (1), first, the maximum search range is a range equivalent to the short-circuit current and the open voltage. By adjusting this search range, adjustment of the search time is enabled. For example, by setting the search range within a range highly possibly including the maximum power point over past experiences, a search at short times is enabled. However, in the case of a solar light panel, the curved line that indicates the current-voltage characteristic may indicate multiple peak points. In this case, when the search range is purposefully narrowed down, only the peak point within such a range is searched, enabling a search at short times. Conversely, when the search range is extended, although the search time becomes long, a possibility that a true maximum power point is searched increases. That is, setting of the search range has a strategic reason for up to which peak point the search will be made in relation to the search time.

As for the reason (2), according to the power converter 400, when a search is made to a low voltage in the MPPT control, the search approaches the short-circuit current, causing a large current to flow. Because of the specification of the power converter 400, the current that can flow has a limit, and thus a search beyond this limit is not allowed in some cases. That is, the upper limit of the voltage or the current and the lower limit thereof which enable the power converter 400 to operate properly are always present. Hence, the upper limit of the search range and the lower limit thereof may be set in accordance with the design of the power converter 400. That is, setting of the search range has a reason that the power converter 400 has an individual restriction.

The search range according to this embodiment is not limited to any particular range, but is an appropriate range in consideration of the above (1) and (2). As an example, the search range may be any one of the followings, or a combination of some of or all of the followings: fluctuation width by a temperature coefficient; the fluctuation width per a product; a detection error; and a margin. The fluctuation width by a temperature coefficient is a variability of the maximum power point due to a temperature coefficient in a reference status (STC) defined based on a measurement condition, such as the light intensity, the spectrum, or the temperature. The fluctuation width per a product is a variability caused product by product of the mass-produced power supply 200. The detection error is an error in a detection value of a sensor, the control device 500, etc. The margin is a leeway range.

The start position instructing unit 36 is a process unit that starts, when the search by the searching unit 31 reaches the upper limit of the preset search range, the next search from the lower limit of the search range, and starts, when the search by the searching unit 31 reaches the lower limit of the search range, the next search from the upper limit of the search range. The search terminating unit 37 is a process unit that terminates the search when the search by the searching unit 31 reaches the upper limit of the search range or the lower limit thereof by a predetermined number of times. This predetermined number of times is set in the memory 10 beforehand.

[Action]

Figure 10:
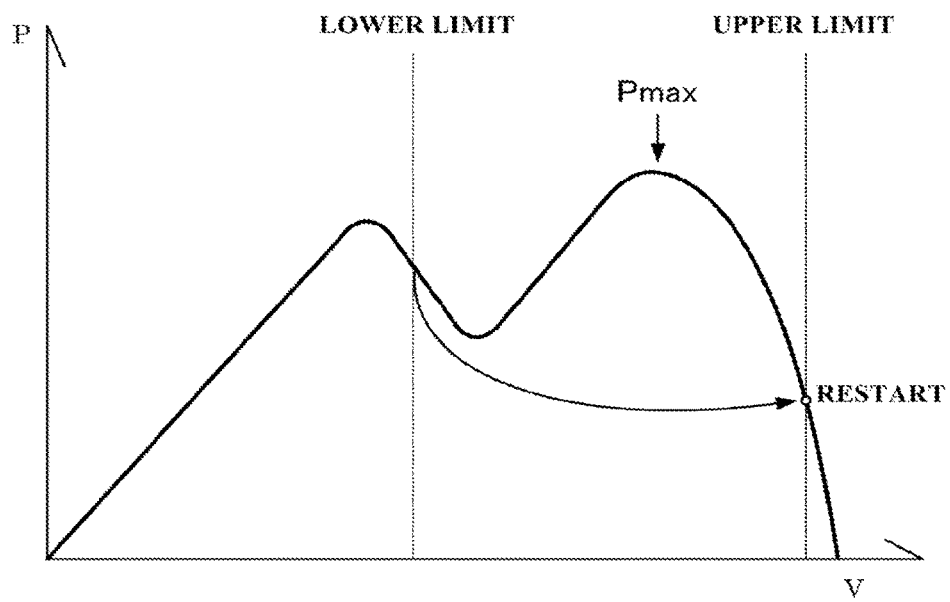
FIG. 10 is a diagram illustrating a start position control according to the fourth embodiment.

An action according to this embodiment as explained above will be explained with reference to FIG. 10. FIG. 10 illustrates the upper limit of the search range and the lower limit thereof in a voltage-power characteristic. For example, the power supply 200 remarkably changes the voltage-power characteristic in accordance with a change in external environment. For example, in the case of a solar battery, the voltage-power curve changes in various forms in accordance with a temperature and a difference in illumination intensity among cells. Hence, an operation not intended is expected.

In this embodiment, as illustrated in FIG. 10, when the search by the searching unit 31 reaches the lower limit of the search range, the start position instructing unit 36 starts the searching operation from the upper limit. Conversely, when the search by the searching unit 31 reaches the upper limit of the search range, the start position instructing unit 36 starts the search operation from the lower limit. Hence, the searching unit 31 searches the maximum point always within the range.

When the search by the searching unit 31 reaches the upper limit of the search range or the lower limit thereof by the predetermined number of times, the search terminating unit 37 terminates the search. That is, when the above operation is repeated by the predetermined number of times, the searching unit 31 terminates the search operation at the upper limit or the lower limit.

[Effects]

As explained above, the voltage-power characteristic is not like the characteristic illustrated in FIG. 10. However, according to the search by the hill climbing method, a search may sometimes performed on a hill different from the maximum point, resulting in a dead-end at the upper limit of the search range in the generated power maximizing control and at the lower limit thereof. Hence, the search does not reach the maximum point of the generated power in some cases.

When, for example, the search reaches the upper limit or the lower limit although power is increasing during the search, the searching operation may be stuck in this condition, and may become difficult to get out from this stuck condition. Such a case may be avoidable by a certain algorithm.

According to this embodiment, however, such an algorithm is unnecessary, and when the search reaches the lower limit, the search is started again from the upper limit, and when the search reaches the upper limit, the search is started again from the lower limit. Such a simple process suppresses a stuck at the upper limit and the lower limit, enabling a sure search that reaches the maximum power point.

However, a stuck at the upper limit and the lower limit is not always a technical problem, and may have a possibility that is a result of the search of the maximum power point. Hence, when the above operation is repeated by the predetermined number of times, the search operation may be terminated at the upper limit and at the lower limit.

Fifth Embodiment

[Configuration]

Figure 11:
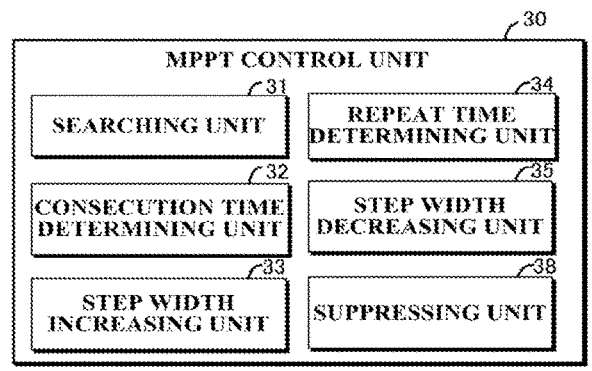
FIG. 11 is a block diagram illustrating an MPPT control unit according to a fifth embodiment.

This embodiment employs basically the same configuration as that of the second embodiment. However, as illustrated in FIG. 11, the MPPT control unit 30 of this embodiment includes a suppressing unit 38 that suppresses a rapid change in operation voltage or operation current. For example, this suppressing unit 38 is a process unit that gives a derivative limit to the instructed value of the voltage or current in the generated power maximizing control. That is, the suppressing unit 38 puts a slope limit that is dv/dt or di/dt in the instructed value to suppress a rapid increase or a rapid decrease.

[Action]

Figure 12:
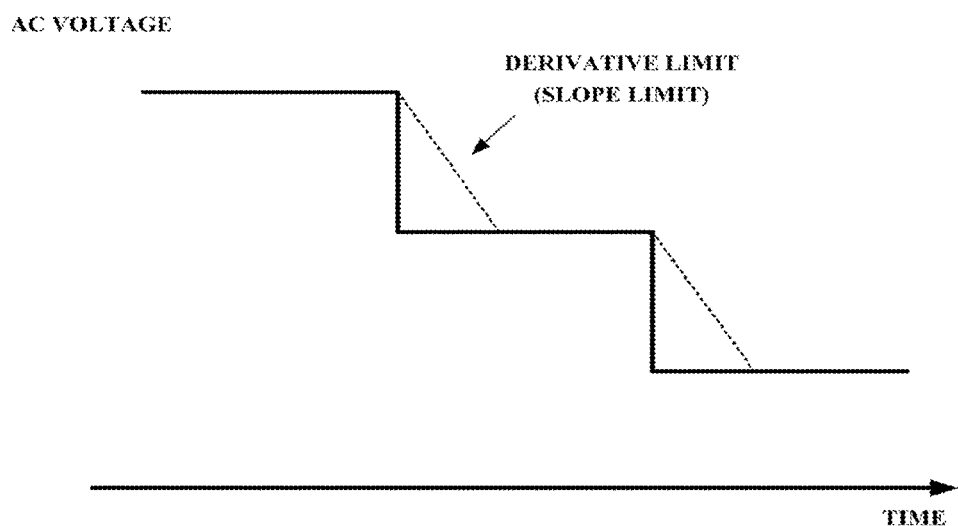
FIG. 12 is an explanatory diagram for a slope limit according to the fifth embodiment.

An action of this embodiment as explained above will be explained with reference to FIG. 12. In this embodiment, the suppressing unit 38 suppresses a rapid increase and a rapid decrease of the instructed value for the voltage or current relative to the converter control unit 20 by the slope limit during the search by the searching unit 31. Hence, a rapid increase and a rapid decrease of the voltage of a capacitor or of the current of a reactor which is the energy buffer of the power converter 400 is suppressed.

Since the control cycle is constant, for example, the more the voltage step with is increased, the higher the possibility that the energy keenly flows in the energy buffer and the energy buffer breaks down increases. Hence, the suppressing unit 38 suppresses a keen flow.

Although a time interval for changing the operation voltage or the operation current remains the same, a rapid change in generated power is suppressed. Hence, there is no adverse effect to the search time. When a low-pass filter is applied as the suppressing unit 38, the similar process to the above explained process is accomplishable.

[Effects]

As explained above, according to this embodiment, even if the voltage of the capacitor or the current of the reactor which is the energy buffer cannot be controlled at fast speed, the downsizing and cost reduction of the energy buffer are accomplishable. Consequently, the downsizing and cost reduction of the power conversion device 100 are accomplished.

Sixth Embodiment

[Configuration]

Figure 13:
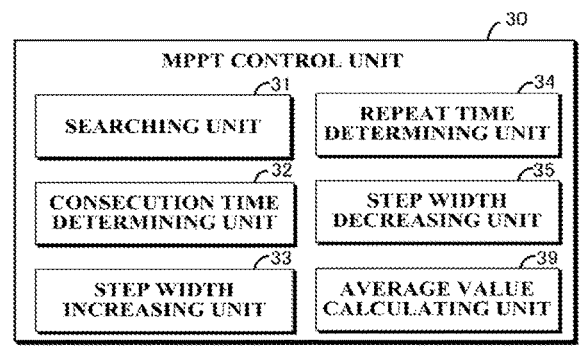
FIG. 13 is a block diagram illustrating an MPPT control unit according to a sixth embodiment.

This embodiment employs basically the same configuration as the second embodiment. However, as illustrated in FIG. 13, the MPPT control unit 30 of this embodiment includes an average value calculating unit 39. The average value calculating unit 39 is a process unit that obtains the average value of the voltage value or the current value within a predetermined range of the cycle of AC power as the operation voltage or the operation current for the searching unit 31 that searches the maximum power point.

[Action]

Figure 14:
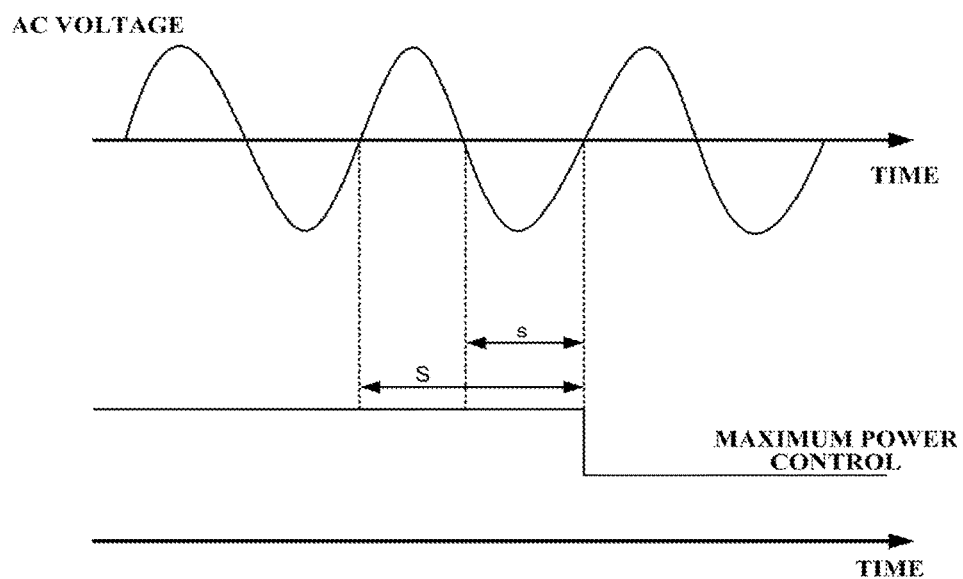
FIG. 14 is an explanatory diagram for a cycle of an AC voltage according to the sixth embodiment.

The action of this embodiment explained above will be explained with reference to FIG. 14. First, as explained above, the searching unit 31 checks the increase or decrease of the generated power by the hill climbing method. In this case, there are a fluctuation in the voltage or the current due to the switching operation of the switching elements in the power converter 400 and a fluctuation when the output by the power conversion device is AC. Hence, constant power is not always maintained, and there is a minor increase or decrease.

For example, such a pulsation component may be eliminated by adding a capacitor at the power-supply—200 side that is the input side of the power converter 400. However, the pulsation component originating from the frequency of the output by the power converter 400 becomes a relatively low frequency, and it is difficult to completely eliminate such a pulsation component or a large capacitor should be added.

In this embodiment, the average value calculating unit 39 obtains the average value in such a way that the searching unit 31 does not falsely determine the increase or decrease of the generated power due to the fluctuation in voltage or current. In this case, as for the AC power pulsation, a double frequency and a sixfold frequency are dominant in the case of the single phase system and the three phase system, respectively. Hence, when, for example, the average value calculating unit 39 calculates the average power at a half cycle s of AC, the fluctuation becomes ignorable for the searching unit 31.

In addition, in present single-phase systems, the power to be controlled by the power converter may contain a first frequency, i.e., an AC frequency due to an adverse effect of harmonic from a load like a half-wave rectifier that causes a current to flow only when the voltage is positive or negative. In this case, the average value calculating unit 39 calculates the average power at a cycle S of AC. This enables the searching unit 31 to ignore the fluctuation.

[Effects]

As explained above, according to this embodiment, a false determination on the increase and decrease of the generated power is preventable without a need of a large capacitor at the input side of the power converter 400. This enables downsizing, cost reduction and control precision improvement of the power conversion device 100.

Examples

Figure 15:
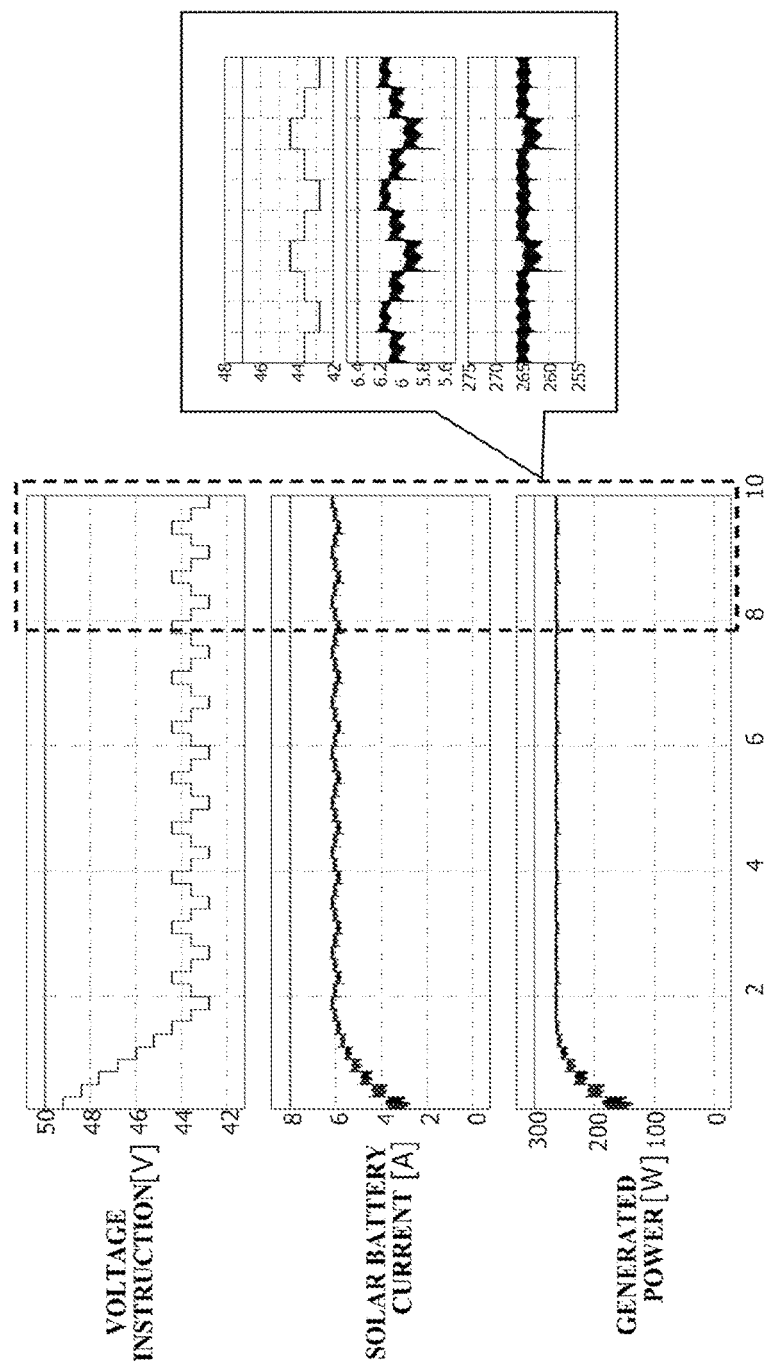
FIG. 15 is an explanatory diagram for a voltage instruction, a solar battery voltage, and generated power when a search is performed at a constant large step width.
Figure 16:
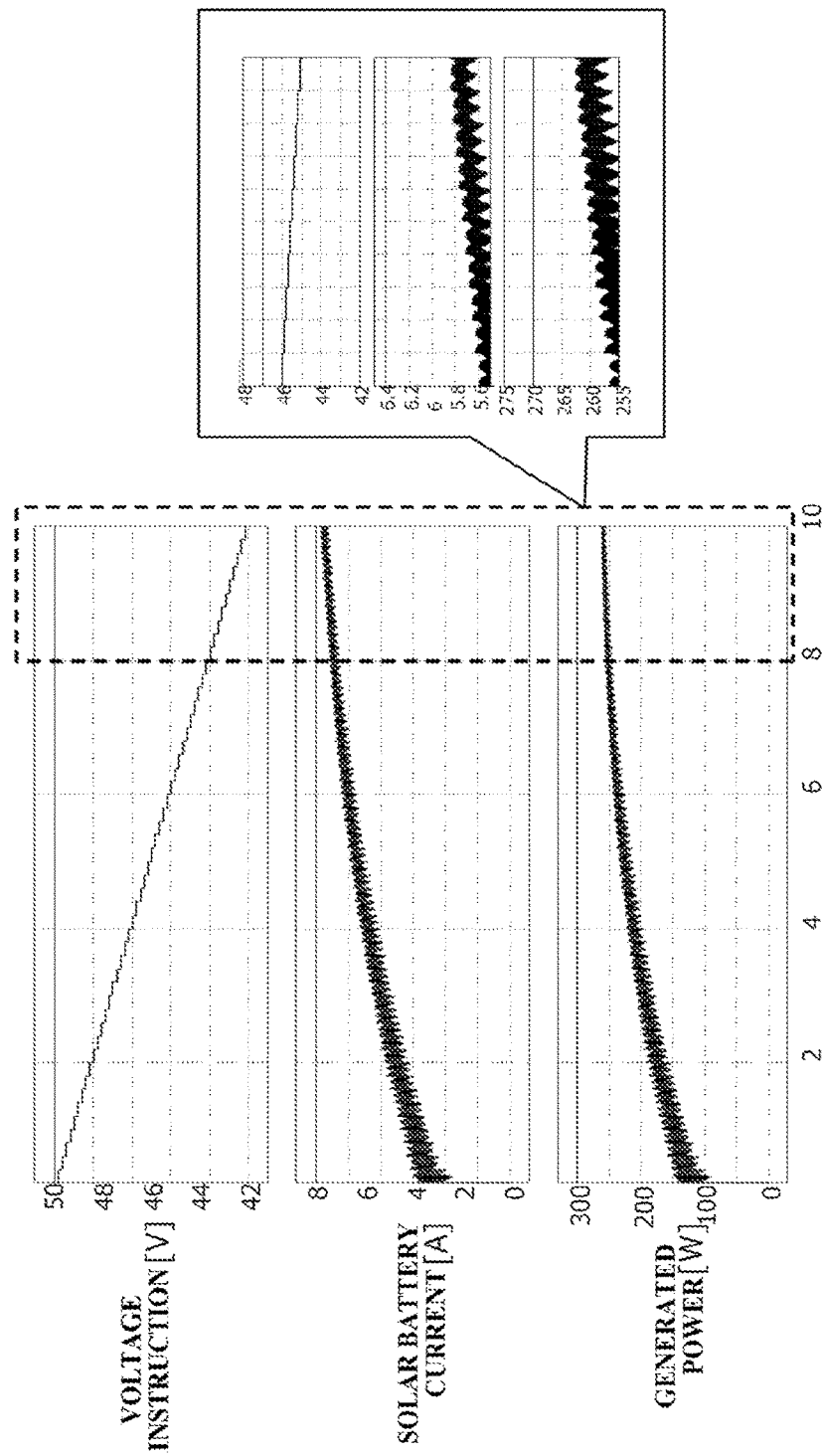
FIG. 16 is an explanatory diagram for a voltage instruction, a solar battery voltage, and generated power when a search is performed at a constant small step width.
Figure 17:
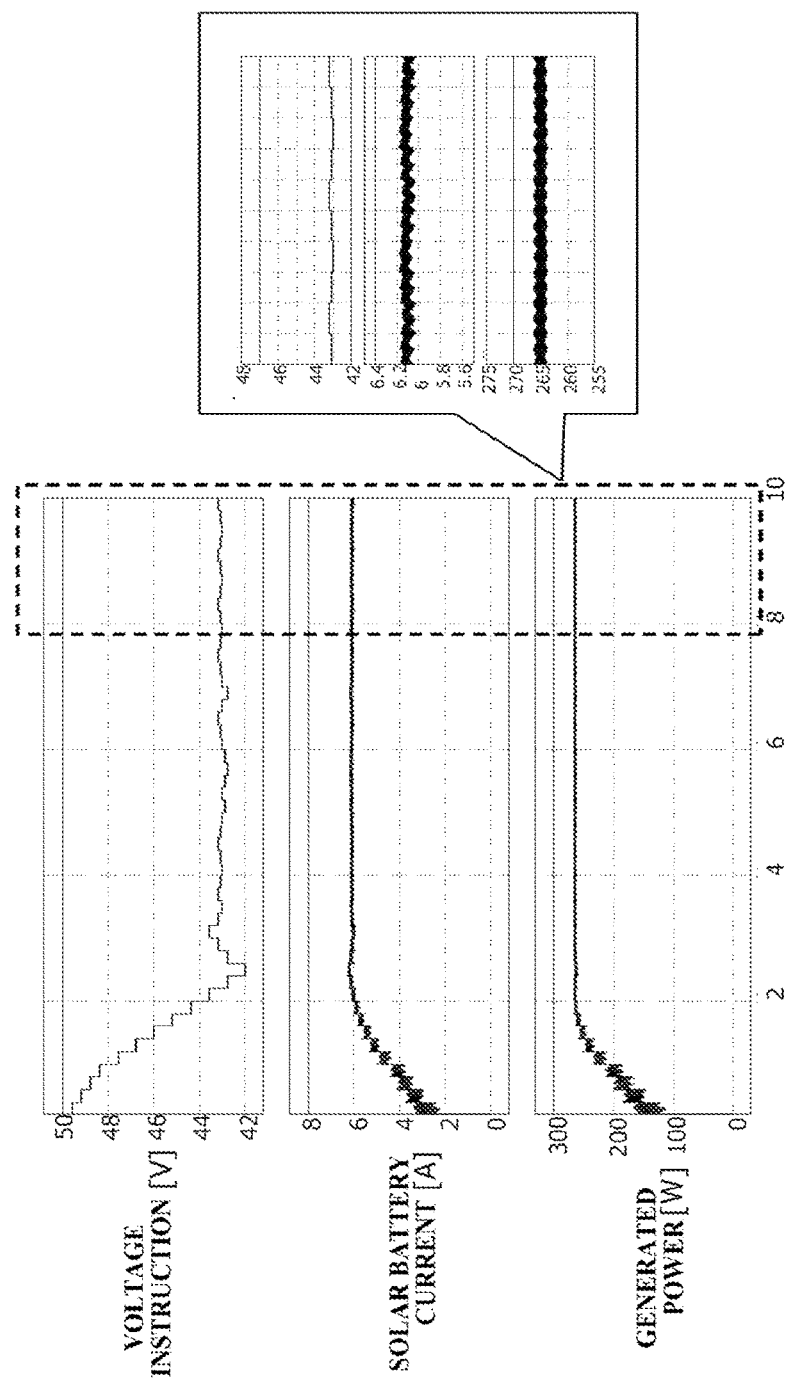
FIG. 17 is an explanatory diagram for a voltage instruction, a solar battery voltage, and generated power when a search is performed with a step width being reduced.

Examples that show the effects of the above embodiments will be explained with reference to FIGS. 15, 16, and 17. In FIGS. 15, 16, and 17, respective horizontal axes indicate a time [s], respective vertical axes at the upper stage indicate a voltage instruction [V], respective vertical axes at the middle stage indicate a solar battery current [A] as a power supply, and respective vertical axes of the lower stage indicate generated power [W] per a time. The side blow-off in each figure is an enlarged diagram for a part of the upper, middle, and lower stage.

In addition, FIG. 15 is a comparison example when the voltage step width was set to a relatively large constant value, FIG. 16 is a comparison example when the voltage step width was set to a relatively small constant value, and FIG. 17 is an example when the voltage step width was changed like the second embodiment.

According to FIG. 15, in the generated power maximizing control, since the set voltage width was large, a necessary time after the start of the control and until the maximum power point was found was short. Since the voltage step width was large, however, there was a step at which the generated power temporarily decreased. Accordingly, although a time to find the maximum power point is short, the amount of generated power decreases.

According to FIG. 16, in the generated power maximizing control, since the set voltage step was small, there was little step at which the generated power temporarily decreased, but a necessary time to find the maximum power point was long. Accordingly, there was a delay in finding the maximum power point, and it was difficult to cope with a time-by-time change in solar light emitted to solar batteries. This resulted in a loss of power generation opportunity, thereby decreasing the amount of generated power.

FIG. 17 illustrates the example of the embodiment, and shows a waveform when the voltage step was changed. A necessary time to find the maximum power point was short, and from this condition by decreasing the voltage step, an occasion in which the generated power temporarily decreased was avoided. Therefore, the maximum power point was found at fast speed, while at the same time, the amount of generated power was large.

Note that the example in FIG. 17 is a circuit analysis result to show the operation of decreasing the voltage step. However, as explained in the first embodiment, the operation of increasing the voltage step is also applicable. Since both operations are similar to each other, the detailed explanation will be omitted. In addition, an amount of change to decrease or increase the voltage step is not limited to any particular amount. That is, according to the operation of decreasing the voltage step, the voltage may be changed like 4 V, 3 V, 2 V, and 1 V in this order in sequence. Conversely, according to the operation of increasing the voltage step, the voltage may be changed like 1 V, 3 V, and 4 V in this order in sequence.

Other Embodiments (1) The above embodiments are not limited to the above examples. For example, various power converters for the power conversion device and various power supplies to be connected thereto are applicable. Hence, the power conversion device is not limited to the so-called PCS only, and may be any devices which are capable of performing the MPPT control and the converter control. In addition, the power conversion device may be a micro-inverter that is connected to each of a large number of solar battery modules.

(2) The specific details, values, etc., of the information applied to the above embodiments are optional, and are not limited to specific details and values. For example, the preferable setting value set up in memory vary depending on the power generation status of the power supply, the specification of the power supply and that of the power converter, etc. In addition, the setting value may be dynamically changed in accordance with the operation status of the power supply and that of the power converter. Still further, in the large-small determination, the matching-mismatching determination, etc., relative to the setting value according to the above embodiments, the determination may be made based on criteria like equal to or greater than and equal to or smaller than so as to include the value subjected to determination, or on criteria like greater than, smaller than, and lower than so as to exclude such a value.

Several embodiments of the present disclosure have been explained above, but those embodiments are merely presented as examples, and are not intended to limit the scope of the present disclosure. Those embodiments can be carried out in other various forms, and various omissions, replacements, and modifications can be made thereto without departing from the scope of the present disclosure. Such embodiments and modified forms are within the scope of the present disclosure, and are also within the scope of the invention as recited in the appended claims and the equivalent range thereto.

REFERENCE SIGNS LIST

100 Power supply system
200 Power supply
300 PCS
400 Power converter
500 Control device
10 Memory
20 Converter control unit
30 MPPT control unit
31 Searching unit
32 Consecutive time determining unit
33 Step width increasing unit
34 Repeat time determining unit
35 Step width decreasing unit
36 Start position instructing unit
37 Search terminating unit
38 Suppressing unit
39 Average value calculating unit

The invention claimed is:

1. A control device for a power converter, the control device comprising:
    a searching unit increasing or decreasing, at a predetermined step width, an operation voltage or an operation current of a power supply connected to the power converter to search a maximum power point of the power supply;
    a consecution time determining unit determining whether or not the searching unit has consecutively increased or decreased the operation voltage of the power supply or the operation current thereof; and
    a step width increasing unit increasing the step width upon determination by the consecution time determining unit that the increase or the decrease has been consecutively executed by a predetermined number of times.

2. The power-converter control device according to claim 1, wherein the searching unit comprises:
    a repeat time determining unit determining whether or not the increase or the decrease of the operation voltage of the power supply or the operation current thereof has been consecutively repeated by the predetermined number of times; and
    a step width decreasing unit decreasing the step width upon determination by the repeat time determining unit that the repeat has been consecutively made by the predetermined number of times.

3. The power-converter control device according to claim 1, further comprising a step width setting unit setting a minimum width of the step with based on a resolution of a carrier wave for a PWM control on the power converter.

4. The power-converter control device according to claim 1, further comprising a start position instructing unit starting, when the search by the searching unit reaches an upper limit of a preset search range, a next search from a lower limit of the search range, and starting, when the search by the searching unit reaches the lower limit of the search range, the next search from the upper limit of the search range.

5. The power-converter control device according to claim 4, further comprising a search terminating unit terminating the search when the search by the searching unit has reached the upper limit of the search range or the lower limit thereof by a predetermined number of times.

6. The power-converter control device according to claim 1, further comprising a suppressing unit suppressing a rapid change in the operation voltage or the operation current.

7. The power-converter control device according to claim 6, wherein the suppressing unit comprises a low-pass filter causing the operation voltage or the operation current at an instructed value to pass.

8. The power-converter control device according to claim 6, wherein the suppressing unit gives a derivative limit to an instructed value for the operation voltage or the operation current.

9. The power-converter control device according to claim 1, wherein:
the power converter is a converter converting DC power into AC power of a predetermined cycle; and
the control device further comprises an average value calculating unit obtaining an average value of a voltage value or a current value within a predetermined range of the cycle of the AC power as an operation voltage or an operation current for the searching unit to search the maximum power point.

10. The power-converter control device according to claim 1, wherein a start position of the search by the searching unit is set to a position equivalent to a short-circuit current or an open voltage.

11. The power-converter control device according to claim 1, wherein a start position of the search by the searching unit is set to a high-voltage side relative to the maximum power point.

12. A power-converter control program causing a computer to execute:
a searching process of increasing or decreasing, at a predetermined step width, an operation voltage or an operation current of a solar battery connected to a power converter to search a maximum power point of the solar battery;
a consecution time determining process of determining whether or not, through the searching process, the operation voltage of the solar battery or the operation current thereof has been consecutively increased or decreased by a predetermined number of times; and
a step width increasing process of increasing the step width upon determination through the consecution time determining process that the increase or the decrease has been consecutively executed by a predetermined number of times.

13. A power conversion device comprising:
a power converter;
a converter control unit controlling the power converter; and
the control device according to claim 1.

* * * * *